Aug. 23, 1949.       H. A. MULVANY       2,479,766
RECOVERY AND PURIFICATION OF WATER
FROM EXHAUST GASES ON AIRCRAFT
Filed May 24, 1944       6 Sheets-Sheet 1

INVENTOR.
HARRY A. MULVANY
BY
ATTORNEY

Fig. 14

*INVENTOR.*
HARRY A. MULVANY
BY

ATTORNEY

Patented Aug. 23, 1949

2,479,766

UNITED STATES PATENT OFFICE 2,479,766

RECOVERY AND PURIFICATION OF WATER FROM EXHAUST GASES ON AIRCRAFT

Harry A. Mulvany, Berkeley, Calif.

Application May 24, 1944, Serial No. 537,172

27 Claims. (Cl. 244—1)

This invention relates to the recovery and purification of water from exhaust gases on aircraft and it can be applied to any aircraft that produces waste gases from the operation of its propelling apparatus, or from any of its auxiliary apparatus.

More specifically, my invention is addressed to the problem of water supply on transport aircraft including controls for the apparatus and involves also a method and apparatus for treating waste gases or exhaust gases from aircraft apparatus, operable while the aircraft is in flight to recover at least a portion of their water content, and to treat and process the recovered water so that it will be suitable for the many uses incidental to aircraft travel.

The present application is a continuation in part of my abandoned prior application, Serial No. 396,800, filed June 6, 1941.

The procedure I employ involves the cooling of the gases of combustion to produce a water condensate. This condensate water contains toxic ingredients including lead and ammonia, and its acidity is high, which of course renders it unfit for the uses of potable water. In accordance with my invention I may eliminate these objectionable characteristics by my treatment of the gas before the condensation, or from the water of condensation containing the impurities carried in the gas.

Aircraft transports employed in long non-stop flights find it necessary to carry a considerable quantity of water for cooking, washing, and as drinking water, etc. In present practice on larger type transport airplanes as much as forty gallons must be carried and even this quantity is found to be inadequate.

It is most desirable to condition the air in the cabins of passenger craft in long flights at high altitudes, and this involves the introduction of mosture into the cabin air; but the quantity of water that would be necessary to do this is so great that it is impracticable for the aircraft to carry sufficient water for this purpose.

It is also a fact that the horse-power of internal combustion engines on aircraft may be increased approximately 20% by injecting moisture into the intake manifold. This can be accomplished for short periods without damage to the engine, and has the advantage of increasing the mileage while cooling the engine.

In view of the many demands for water on a modern transport aircraft, outlined above, the carrying of a sufficient water supply has become a serious problem, as, of course, the dead load on the aircraft must be held down to a minimum.

One of the objects of the present invention is to provide simple means for recovering the water carried in the waste gases, from engines carried by the craft, and for purifying it, so that it is potable and usable for the various purposes outlined above.

Aircraft operate under widely varying conditions as to atmospheric temperatures and flying elevations both of which variables affect the performance of such apparatus. Hence one of the objects of my invention is to provide general controls for the apparatus that will operate satisfactorily under all conditions to insure an adequate water supply, while at the same time effecting a saving in weight carried by the craft. More specifically stated, it is one of my objects to utilize the slipstream of atmospheric air to effect the condensation of the waste gases, and to provide adequate controls for preventing injury to the condenser or freezing of the condensate water due to abnormally low temperature of the slipstream; also to prevent overheating of the condenser during the warming up of the engine or engines.

In the practice of the invention a portion of the exhaust gases is diverted from the engine exhaust for condensing, and one of the objects of the invention is to provide simple means for automatically regulating the quantity of gas diverted into the condenser, controlled by the conditions existing at the condenser.

Another object of the invention is to provide simple means for automatically regulating the quantity of slipstream air passing through the condenser in accordance with the existing conditions at the condenser; also to provide controls that will function to prevent ice forming within the condenser.

One of the objects of the invention is to provide means for removing the toxic ingredients from the recovered water condensate which will combine a minimum of weight with the maximum of purifying function in producing potable water; also to eliminate its acidity.

Further objects of the invention will appear hereinafter.

The invention consists in the apparatus, and in the method described hereinafter the features of which contribute to produce an effective method and apparatus for the recovery and utilization of water in an aircraft.

A preferred embodiment of the invention is described in the following specification while the broad scope of the invention is pointed out in the appended claims:

In the drawing which is for illustrative purposes.

Figures 1, 2, 3, 4:
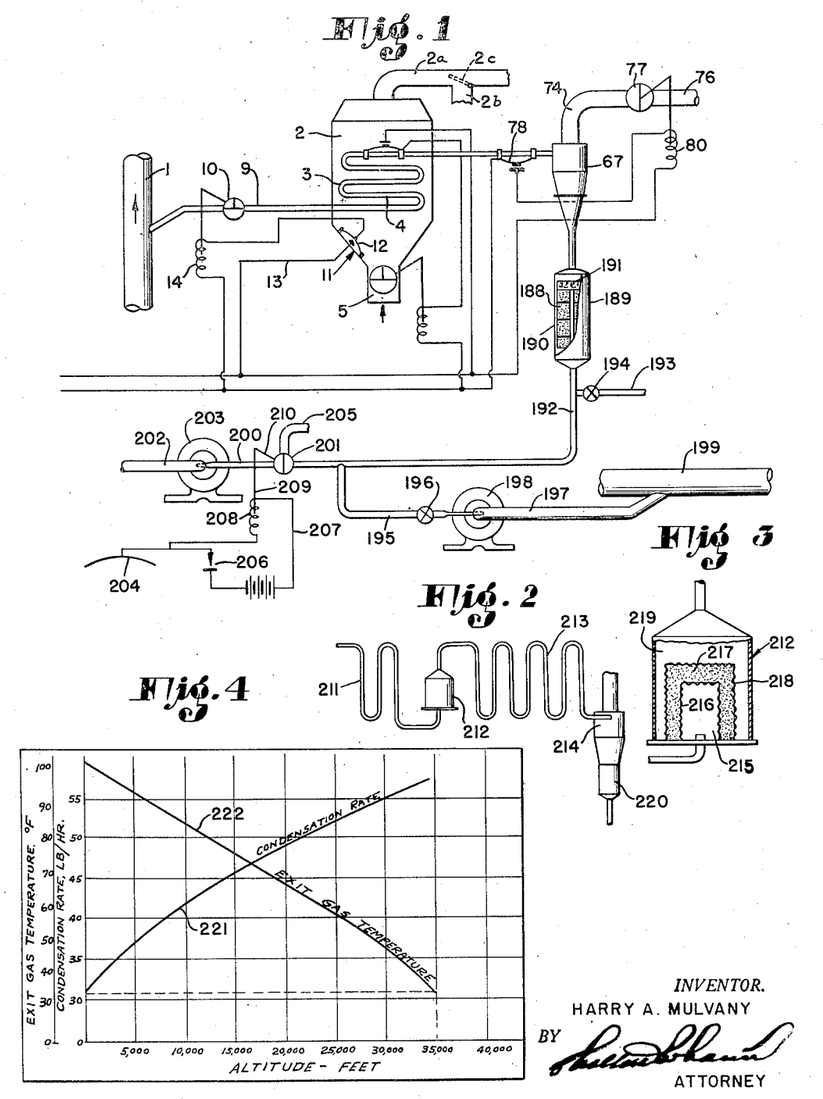
Fig. 1 is a diagrammatic view illustrating the elements of my apparatus and showing the controlling means, certain parts being broken away.
Fig. 2 is also a diagrammatic view and illustrating a method and means for practicing my invention in which the toxic ingredients are removed from the gases before they are cooled sufficiently to condense the moisture carried by them; this view also illustrates a portion of the separator for separating the water condensate from the gases, including means for filtering the water.
Fig. 3 is a view upon an enlarged scale illustrating more fully the means shown in Fig. 2 for removing the toxic ingredients from the gases.
Fig. 4 is a chart illustrating the exit gas temperatures and the condensation rate in pounds per hour plotted against varying altitudes.

In practicing the invention, as shown in Fig. 1, 1 indicates an exhaust pipe for gases of combustion coming from an internal combustion propelling means for an aircraft, or from an auxiliary engine employed for any purpose.

These hot gases may come from an internal combustion engine of any known type or from a rocket-type propelling apparatus such as is now coming into use. A portion of the gas flowing along this outlet pipe 1 is diverted to an apparatus for removing the toxic ingredients either from the gas while still in its gaseous state, or from condensate water produced by cooling the gases directly in a condenser 2. This is accomplished by passing the gas through a duct preferably in the form of coils 3 including a series of passes 4. This condenser is indicated diagrammatically in Fig. 1 but is shown in detail in Fig. 5. It has a forwardly projecting intake 5 that connects to an inlet mouth (see Fig. 6) that may be located in the leading edge of a wing 7. However, this location for the air inlet or the intake is not essential, and it may be located at any point on the aircraft such as in a nacelle or in any other location where a portion of the slipstream of atmospheric air will naturally flow into the intake 5 when the aircraft is in flight.

The interior of the casing 8 of the condenser 2 operates as a duct for conducting the atmospheric air past the coils 3.

As the proper functioning of the condenser depends largely upon the relative proportions of the hot gases passing into the coils 3 and the cooling current of atmospheric air passing into the intake 5, I provide automatic means for controlling the flow of the diverted hot gas through the gas pipe 9. This is accomplished through the medium of a valve 10 that is controlled automatically by a pressure-actuated means or device 11 located inside the intake or condenser body and which is actuated by the changes of internal pressure or lateral pressure exerted by the air current flowing through the condenser. There is, of course, considerable changing in this pressure, due to changes in speed of the aircraft, and to the fact that there is considerable resistance to flow of the air current through the condenser and around the coils 4. This pressure sensitive device or "pressure-stat" 11 is illustrated more in detail in Fig. 7 and will be described more fully hereinafter. This device includes a diaphragm 12 which is exposed to the pressure of the flowing current of air, and if this pressure rises to a certain point, for example, to a pressure corresponding to five inches of a water column, the diaphragm will move so as to close an electric circuit 13 including electro-mechanical means 14 which will operate the valve 10 to move it toward an open position proportionately to the rises in the pressure exerted against the diaphragm 12.

Figure 7:
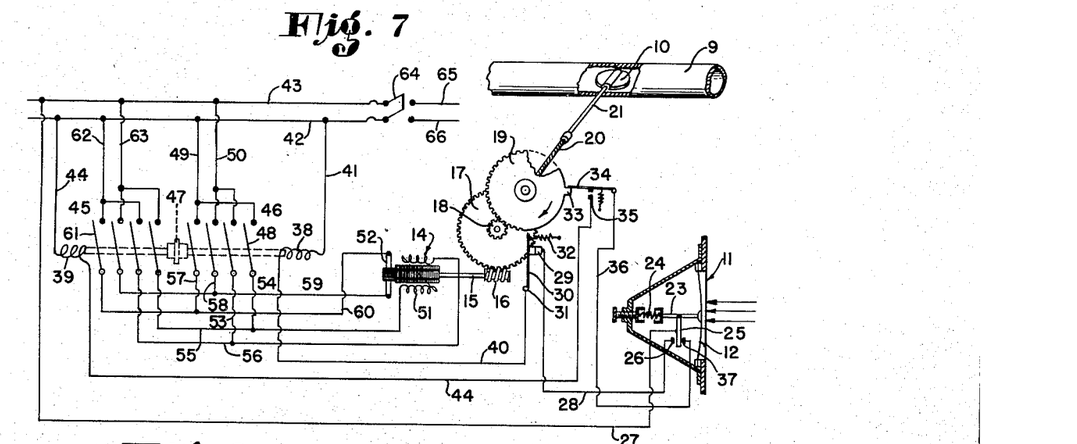
Fig. 7 is a diagrammatic view illustrating a portion of the gas intake that conducts the gas into the condenser and illustrating an automatic control for a valve in this intake to set the same in accordance with the speed of air flow through air intake and the condenser, and illustrating the electrical apparatus that is automatically controlled to close the circuit through a motor for swinging the valve toward or from its closed position.

In Fig. 7 14 indicates a motor diagrammatically. This is preferably a shunt-wound motor the shaft 15 of which operates through a worm 16 to drive a worm-wheel 17 which operates through reduction gears including a pinion 18 and a large gear 19, to drive a flexible shaft 20 that connects to the shaft 21 of the valve 10 which as indicated is of the "butterfly" type.

Figure 5:
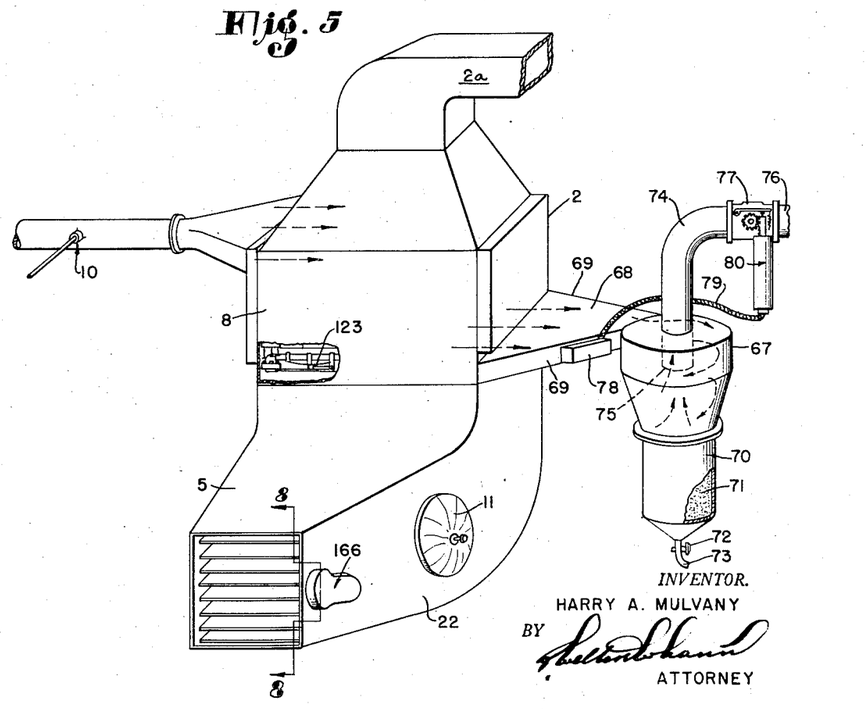
Fig. 5 is a perspective illustrating the apparatus including the condenser, its gas intake, and its out-take from the condenser; and also showing the intake for the atmospheric air from the slipstream. This view also illustrates the separator that takes the gases from the condenser and separates the water condensate from the remaining gas; and the control for the gas outlet from the separator. This view is broken away to illustrate a preferred point of application of a thermostatic device which I employ to prevent the condenser from acquiring too low a temperature.

In Fig. 5 this pressure-sensitive device is illustrated mounted on the side wall 22 of the intake 5. However, in Fig. 7, which is a diagrammatic view, this device is illustrated as though located on the opposite wall of the intake so that the pressure upon the diaphragm 12 would be exerted upon its right side as illustrated in Fig. 7. When this diaphragm is moved by rising pressure, a stem 23 connected to the diaphragm will move toward the left and compress a light return spring 24, and in this movement a lateral projecting contact finger 25 carried by the stem will engage a fixed contact 26 which closes a circuit from the conductor 27 to the finger 25, and thence through the conductor 28 that is connected to the fixed contact 26. This conductor 28 at its other end is connected to a fixed contact 29 which cooperates with a movable contact lever 30 pivotally mounted at 31 and normally pulled by a spring 32 into engagement with the fixed contact 29. However, this switch composed of the contacts 29 and 30 is a limit switch and will be opened automatically through the agency of a lug 33 projecting out from the periphery of the gear wheel 19, which will engage the end of the lever 30 and push it toward the left, thereby opening the circuit through the motor 14. This will operate to effect a closing movement of the valve 10 to a nearly closed position. As illustrated in Fig. 7 however this lug 33 is shown in contact with the end of a pivoted switch lever 34 which cooperates with a fixed contact 35 so as to operate as a limit switch for the opening movement of the butterfly valve 10. In other words, as illustrated in Fig. 7, the contacts 34 and 35 can cooperate to maintain a temporary circuit through a conductor 36 that connects this lever 34 with a contact 37 that corresponds to the fixed contact 26 already described, but which is closed by a movement of the diaphragm 12 which would be due to a reduction in pressure within the air intake 5.

The circuits through the motor 14 are controlled by two solenoids 38 and 39 the former of which is connected to a conductor 40 connected to the contact 31; which is connected by conductor 41 to a main circuit wire 42; the other main circuit wire 43 has the conductor 27 already referred to, connected to it.

The fixed contact 35 and the coil 39 are connected to a conductor 44 that connects to the main conductor or wire 42.

There are two 4-point switches 45 and 46 which in Fig. 7 are shown in their open position. Either of these switches may be closed without closing the other and when one is closed a mechanical interlocking connection 47 of any suitable form prevents the other switch from being closed. These interlocking preventers for performing this function are standard devices and consequently need not be described in detail. When the solenoid coil 38 is energized it pulls all four of the connected switch levers 48 toward the right as viewed in Fig. 7, to connect the live conductors 49 and 50 to the field coils 51 of the motor, and to the armature of the motor through the commutator 52; the circuit through the field coils 51 is established through the wires 53 and 54 that connect with wires 55 and 56 respectively leading into and from the coils 51. The circuit through the armature is established through wires 57 and 58 connecting to conductors 59 and 60.

When the solenoid coil 39 is energized the four contact levers 61 connect up the live wires 62 and 63 to the armature circuit wires 59 and 60 and also to the field coils 55 and 56, the direction of flow of the current being such that the motor will run in reverse direction from that when the switch 46 is closed. A hand operated switch 64 may be provided for connecting up to a source of electromotive force supplied through conductors 65 and 66.

In addition to controlling the quantity of gases of combustion diverted from the exhaust pipe 1, I provide means for controlling the out-flow of the gases that have been separated from the condensate water while they are leaving the separator 67. This separator as illustrated in Fig. 5 is a centrifugal type of separator into which the gases are delivered from the condenser out-take or separator intake 68. In Fig. 5 this is illustrated as a flat form of flue the side walls 69 of which converge toward the point of connection through the side wall of the centrifugal separator 67, so that the gases flow tangentially into the separator, and circulate around within the same in the general manner indicated by the dotted arrows in Fig. 5. By reason of the centrifugal action, the water carried with the gases will be thrown against the circumferential wall of the separator and will pass down through a filter 70 in which is maintained a filter bed 71 of a substance capable of removing the toxic ingredients carried in the condensate water. This water collects in the bottom of the casing of the filter 70 and can be drawn off by opening the small valve 72 in its outlet connection leading off from the filter bottom.

The gas outlet pipe 74 leads out through the cover of the centrifugal device and its inlet mouth, indicated in dotted lines at 75, is located at a considerable distance below the cover so that the circulating gases pass down to a lower level before they finally pass up through the outlet. As illustrated, the upper part of the outlet pipe 74 has a goose-neck so as to present a horizontal extension 76, and in this extension a valve 77 is provided for regulating the effective area of flow of the gas passing the valve. The degree of opening of this valve is regulated through the agency of a thermostat device 78 which is preferably applied so that it takes its temperature from that of the gases passing through the separator intake 68, a wire cable or connection 79 being provided leading over to the valve controlled mechanism 80 that is associated with the valve 77.

Figures 10, 11:
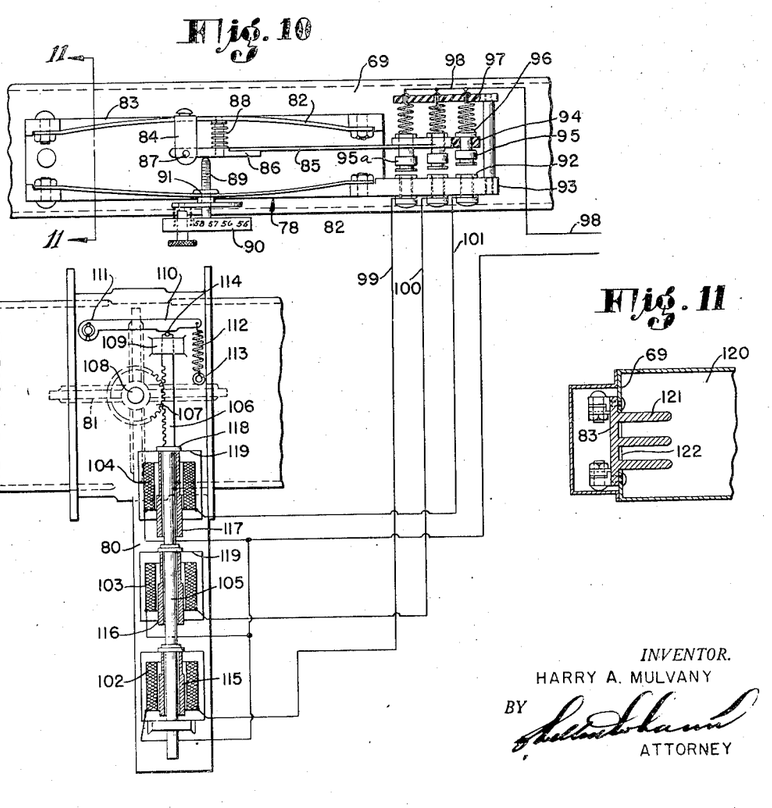
Fig. 10 is a diagrammatic view and includes a side elevation of the mechanism of a thermostat device that is applied to the gas out-take from the condenser, and including a portion of the outlet pipe for carrying the gases away from the separator. This view illustrates the electric circuits for effecting the automatic control of a valve located in this gas outlet pipe, from this thermostatic device.
Fig. 11 is a vertical section taken about in the plane of the line 11—11 indicated on Fig. 10.

This valve controlled mechanism 80 and the thermostat device 78 are illustrated more in detail in Fig. 10. The thermostat device 78 is constructed so that it will open or close the vane 81 of this butterfly valve in stages. Any suitable thermostat device may be employed for this purpose that will function to control the valve 81 so that it is operated in this way. In the present instance as illustrated in Fig. 10, the thermostat device includes two Invar bars or equivalent elements 82 the ends of which are connected to a base-plate 83 secured to the side wall 69 of the intake 68. The bars 82, as illustrated, are bowed outwardly away from each other and when the base plate 83 expands or extends itself by increase of temperature of the gases the bars 82 will assume a more flattened arc, that is to say, they will approach each other. Between the two bars 82 and supported on a fulcrum bracket 84 a contact lever 85 is supported. This lever is attached to a lever head 86 carrying a pivot pin 87 that connects the lever head to the supporting bracket 84. A coil spring 88 between the bar 82 that carries the fulcrum bracket 84, and the lever head 86, urges the contact lever 85 downwardly as viewed in Fig. 10 and holds it against an adjustable stop 89. This adjustable stop is carried on the opposite bar 82. By adjusting a calibrated wheel 90 the stop 89 can be adjusted in or out in its threaded bearing 91 to alter the position of the tip of this stop screw 89, thereby enabling the position of the free end of the lever 85 to be adjusted with respect to the insulated contacts 92 mounted on an insulated plate 93.

The free end of the lever 85 carries an insulating plate 94 in which relatively movable contacts 95 are carried. These contacts are mounted on shanks 96 that are freely movable through guide openings in the insulating plate 94, and the upper ends are pressed downwardly by coil springs 97 that also function to carry current to them from a lead-wire 98. The distance between the forward ends of the relatively movable contacts 95 and the relatively fixed contacts 92 are graduated preferably as shown. Contact 95a that is located nearest to the pivot pin 87 of the lever has the shortest distance to move to close the circuit through it, and so on. With this arrangement as the lever 85 swings toward the contacts 92 evidently they will be engaged in succession by the cooperating relatively movable contacts 95 so as to close circuits through the circuit wires 99, 100 and 101 in succession. These wires connect respectively to corresponding solenoid coils 102, 103 and 104 which function in succession but at different moments, to advance a core-bar 105. The upper end of this core-bar is formed into a rack 106 meshing with a pinion 107 attached to a trunnion 108 of the butterfly valve 81.

The upper end of the rack 106 is guided to slide through a lug 109, and beyond the lug its end is engaged by means to return this bar and hold the butterfly valve normally in open position. In the present instance the upper end of the rack 106 thrusts against the lever 110 pivotally supported at 111. The end of this lever carries a spring 112 that is attached to a fixed eye-bolt 113. Anti-friction ball 114 may be provided between the end of the rack 106 and the side of the lever 110 to reduce the friction entailed in this movement.

The core bar 105 carries three solenoid cores 115, 116 and 117 respectively, which are located in graduated positions with respect to the lower ends of their corresponding coils, with the lowest core 115 located further up into its corresponding coil 102 than the other cores. With this organization of parts it will be evident that when the circuit is closed first through the wire 99 the core 115 will be pulled up a short distance into the coil 102. When the circuit is closed in the wire 100 the core 116 will be pulled up a further distance into its coil 103; and likewise as to the core 117 and its coil 104. This will effect movement of the butterfly valve 81 toward its closed position in three stages as described.

Of course as the circuits are opened at the contacts 92 the spring 112 will return the butterfly valve 81 step-by-step to its wide open position as shown in Fig. 10. In this open position a collar or collars 118 on the core-bar 105 or on the rack 118 may seat against a rest indicated at the horizontal lines 119. Only one of these collars is necessary.

In order to enable the base plate 83 to quickly acquire the approximate temperature of the hot gases flowing through the gas duct 120 (see Fig. 11) the inner face of this base plate 83 is provided with a plurality of projections or fins 121 that extend into the interior of this flue. They may extend through an opening 122 formed in the side wall 69.

The control mechanism illustrated in Figs. 10 and 11 will operate to close the butterfly valve 81 more or less, according to the temperature of the gases flowing through the flue 120 of the intake 68. That is to say if these gases have an abnormally high temperature the butterfly valve 81 will assume its most nearly closed position thereby reducing the flow of the gas into and through the separator 67.

In the operation of this apparatus when flying through an atmosphere of abnormally low temperature there is danger of the slipstream air current that passes through the air intake 22, cooling the condenser 2 sufficiently to cause freezing of moisture within it. In order to overcome this difficulty I provide another control operating automatically to reduce the flow of slipstream air through the intake 22 if the temperature of the condenser becomes dangerously low. The apparatus for this purpose includes a thermostatic device 123 (see Fig. 5) that is preferably attached to a guiding wall for the exhaust gases that pass through the condenser, and preferably at a point at or near where those gases find exit from the condenser, because this is the point where the lowest temperature will naturally exist in the condenser.

Figure 8:
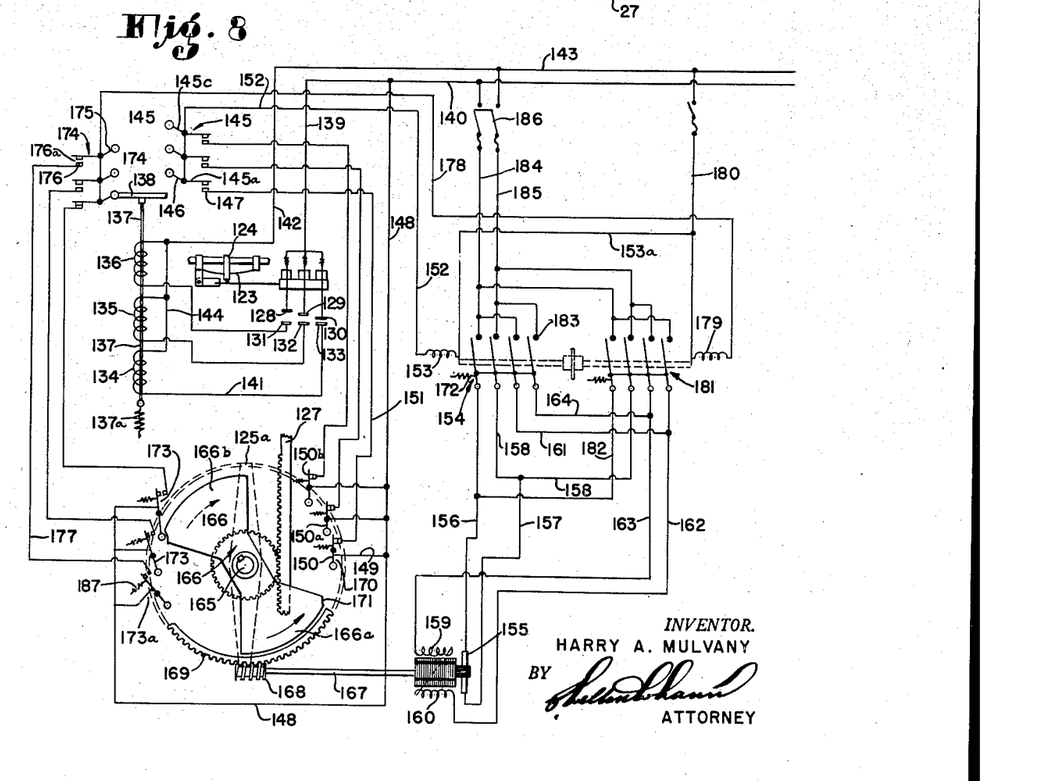
Fig. 8 is also a diagrammatic view illustrating one of a set of dampers or louvers that control the admission of atmospheric air from the slipstream through the intake of the condenser, and illustrating electrical apparatus for controlling the same automatically to set the louvers in a regulated position depending upon the temperature of that part of the condenser where the thermostatic device is applied. In this view the intermediate or middle louver is illustrated in dotted lines with the rack broken away that connects it to the other louvers located within the air intake for operating them in unison.
Figure 9:
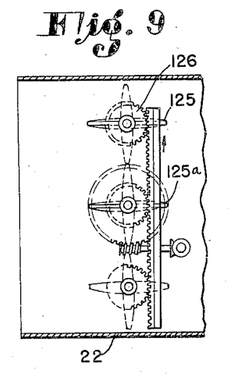
Fig. 9 is a fragmentary vertical section in a front and rear direction taken through the air intake and illustrating the louvers in their open position in full lines.

This thermostatic device 123 and its associated control apparatus is illustrated in Fig. 8. In a condenser such as illustrated which would have a series of passes such as the passes 4 illustrated in Fig. 1 through which the gases pass in succession, the thermostatic device 123 would be attached to one of the tubes of the last pass. That is to say at or near the point where the gases were finding exit from a condenser. In Fig. 8 124 indicates such a tube, and the thermostatic device 123 would be attached to its outer side. In this Figure 8 and in Figure 9 I illustrate a louver type of valve involving a plurality of butterfly valves or separate louvers indicated generally by the numeral 125 in Fig. 9. All of these three louvers are moved in unison by any suitable means such as by means of a pinion 126 attached to the trunnion of each of these louvers, and all of which mesh with the teeth of a rack 127 that is movable up or down to close or open the louvers.

The switches controlled by the thermostatic device 123 would have substantially the same construction as that illustrated in Fig. 10 including three movable contacts 128, 129 and 130 cooperating with relatively fixed contacts 131, 132 and 133. The thermostatic device 123 is mounted so that as the temperature of the wall of the tube 124 drops to a certain degree the contact 130 will move down and engage the relatively fixed contact 133. This will close a circuit through a solenoid coil 134 that corresponds to the solenoid coil 102 shown in Fig. 10. This solenoid coil 134 is the lowest one of a series of three including upper coils 135 and 136 which coils correspond to coils 103 and 104 as shown in Fig. 10. These solenoid coils exert magnetic force upon cores not illustrated, but which are similar to the cores 115 attached to the core bar 105. In other words when the coil 134 is energized it will give a limited upward movement to the core bar 137 that extends up through all three of the coils. This core bar carries at its upper end a contact actuator head 138. Now when contacts 130 and 133 come together, current flows through the wire 139 from the main 140 and through the wire 141 to the coil 134, thence by a return wire 142 back to the other main conductor 143. As indicated, the coils 134, 135 and 136 are wired in parallel from the conductor 142 through a branch wire 144. When the contact actuator head 138 rises by successive steps due to the successive closing of the contacts 130, 132 and 131 the actuator head 138 will close any one of the three normally open switches 145 located on the right hand side as shown in Fig. 8. In the first step or stage of actuation of this actuator head 138 it will engage the end of the tail arm 146 of the switch lever of the lowest switch indicated by the numeral 145a and will close a circuit through the relatively fixed contact 147. When this occurs a circuit will be closed from the main wire 140 through wire 148, branch wire 149 and normally closed switch 150 through a wire 151 that leads up to the contact 147, and from this point through wire 152 over to a solenoid coil 153, completing its circuit through wires 153a and 180. This solenoid controls a 4-point switch 154 and this coil can close this 4-point switch 154 so as to establish a circuit through a motor armature 155 by way of wires 156, 157 and 158. At the same time another pair of levers of this 4-point switch 154 will close a circuit through the field coils 159 of this motor 160, through wires 161, 162 and 163, the latter of which connects to a branch wire 164 leading out through this switch. This will drive the motor in a direction to rotate the trunnion 165 of the middle louver 125a in an anti-clockwise direction as indicated by the arrow in Fig. 8. This trunnion 165 carries a duplex type fan shaped contact wiper 166 having two fan shaped wiper ends, or fans, 166a and 166b. In the present instance the motor shaft 167 carries a worm 168 that meshes with a worm wheel 169 rigid with the trunnion 165 for rotating the louver 125a.

When the contact wiper 166a engages the end of the lever 170 of the switch 150, already referred to, a cam notch 171 in its forward edge engages the end of this switch lever and swings it towards the right, after which the end of this lever rides along and dwells on the circumferential periphery of the wiper. This holds this switch open against the force of its spring that normally holds it in a closed position. Opening this switch, of course, opens the circuit through the coil 153, and when this occurs the spring 172 connected with the switch lever of the switch 154 will pull this switch into its open position and stop the motor. The switch 150 is one of three similar switches, the other two switches similar to it being indicated by the reference numerals 150a and 150b. After the louvers 125 have been moved to the first stage closing position as would occur when the contact head 138 closes the switch 145a, if the temperature at the controlling thermostatic device 123 falls further, then a circuit will be closed through the fixed contact 132 which is wired to the coil 135, just like the coil 134 is wired to the contact 133. This coil 135 will operate to pull the armature rod 137 further up and cause the head 138 to engage the tail arm of the intermediate switch 145b, and this will close the circuit through the switch 150a through the wires 148 and the wires 152; and this will reclose the 4-point switch 154 just as it was closed before through the agency of the switch 145a. This will drive the motor in the same direction as before and move the contact wiper 166 further along in its same direction of movement. When the wiper end or fan 166a engages the end of the lever of the switch 150a it will open this motor circuit and stop the motor. The louver 125a will now be in its intermediate position. If the temperature at the tube 124 drops still lower, then the circuit will be closed through the contact 131 which will close the circuit through the coil 136, and this will close the circuit again through coil 153 and close the motor switch 154 again as before. The motor will then move again in the same direction, causing the wiper fan 166a to advance and eventually open the motor circuit again by engagement with the lever of the switch 150b.

When the contact wiper 166 is in the position just mentioned, that is to say, when the fan 166a has wiped over all three of the switches 150, 150a and 150b they will all remain open and at the same time the opposite fan 166b will have wiped across and closed three other normally open switches indicated generally by the reference number 173. These switches 173 are wired up individually to three normally open switches indicated generally by the reference numeral 174, and these latter switches are arranged so that their tail levers 175 can be engaged by the left end of the actuator head 138. Assuming that the louver 125a has been advanced to its third stage position, it should be understood that in that position the contact head 138 will be in engagement with the actuating lever of the uppermost switch 145c of the switches 145.

Assuming that the temperature at the thermostatic device 123 commences to rise, then the circuit will be opened through the contact 131 and this will permit the return spring 137a of the armature rod 137 to pull the rod down as far as the energized coil 135 will permit. This will stop the rod 137 in a position to enable the left end of the actuator head 138 to engage the uppermost switch 174a of the switches 174, and this will close a circuit through a fixed contact 176 that cooperates with this uppermost switch. This will close a circuit from the main wire 140 down through wire 148, through the lever actuated switch 173a (which is now held closed by the fan 166b), and thence up through wire 177 to fixed contact 176a; and thence by wire 178 over to coil 179, and from this coil on wire 180 over to the main wire 143. This will operate a 4-point switch 181 that is similar in construction to the switch 154 and will move this switch to its closed position thereby closing the motor circuit through the commutator 155 by way of wire 158 already referred to, and wire 182, also closing the motor circuit through the field coils 159 through the wires 162 and 163 already referred to.

The fixed contacts 183 of these two 4-point switches are wired in parallel to wires 184 and 185 that are connected through a switch 186 to the main wires 140 and 143.

Closing the motor switch 181 as described, will of course, drive the motor in a reverse direction, that is to say, in a direction which will drive the switch wiper 166 in a clockwise direction as indicated by the dotted arrow in Fig. 8, and this rotation will continue until the right edge of the fan 166b passes out of contact with the switch 173a, whereupon this switch will be opened by its spring 187 and the motor will stop. However, the fan 166b will still be in contact with the lever of the switch 173b and if, and when, the temperature increases at the thermostat 123 the contact 129 will pull away from the contact 132 and this will de-energize the coil 135 and permit the rod 137 and the switch contact head 138 to drop down to its next position. That is to say as far as will be permitted by the lowest coil 134 which will still be energized.

If and when the temperature at the thermostat 123 rises still further, then the contacts 130 and 133 will separate which will de-energize the coil 134 and permit the rod 137 to drop down to the position in which it is illustrated in Fig. 8.

From the centrifugal separator 67 the condensate water passes down through a constantly maintained filter bed 188 (see Fig. 1). In practice this water may be passed up through the filter bed, but for the purpose of illustration it is shown passing down through the filter bed. This filter bed is carried in a container 189 the interior of which is provided with a helical blade 190 which causes the water to pass in a helix through the filter bed. In this way I greatly increase the length of the course that the water passes through in going through the filter.

At some point in its course, and preferably before the water passes through the filter bed which is of activated carbon, I cause the water to pass through a layer 191 of asbestos, or other material capable of removing the oils or oily constituents and also any solid matter that may be carried in the water. The outlet pipe 192 for leading the water off from the filter 189 may be provided with a branch pipe 193 and valve 194 from which the condensate water is led over to a reservoir for use by the passengers of the plane and for cooking, or other purposes.

This pipe 192 extends down and is provided with a branch pipe 195 and valve 196 which can be opened when desired to admit a small quantity of water into the outlet 197 from a supercharging blower 198 that delivers into the air intake manifold 199 for the engine or other propelling means burning hydrocarbon fuel.

My invention can be practiced to advantage in conjunction with air conditioning apparatus that will now be described and which represents air conditioning apparatus such as described in the patent to Price, Reissue No. 22,272, granted February 16, 1943. In adapting my invention to air conditioning, beyond the branch 195 the pipe 192 has an extension 200 with an automatically controlled valve 201 that will permit water to pass when required into the delivery pipe 202 of a blower or compressor 203 that delivers air into the air conditioned cabin. This valve 201 may be controlled by a humidostat 204 mounted somewhere in the air conditioned cabin, to open the valve 201 when the conditions warrant, to introduce water into the delivery pipe 202. In the position indicated in Fig. 1 this valve 201 is shutting off flow to the blower 203 and is discharging into a pipe connection 205 that would lead to the same tank or reservoir to which the pipe 193 is connected, or to another reservoir if that is more expedient. The humidostat 204 controls an automatic switch 206 in an energized circuit 207 including a solenoid 208, and the core 209 of this solenoid is connected to the lever 210 of the valve 201.

It is not essential to the practice of my invention to condense the moisture from the waste gases before effecting the elimination of the toxic ingredients and the acid ingredients. In Fig. 2 I illustrate apparatus which operates to eliminate the toxic ingredients and acid ingredients from the gases before they are cooled sufficiently to precipitate the water condensate. However, in this instance I prefer to cool the gases down considerably below the temperature that they have when they come from the engine, and for this purpose I employ a cooling coil 211 having a sufficient length to bring the temperature down to a proper temperature for filtering through a filter bed of activated carbon in a filter 212. From this point the gases pass through a cooling coil 213 which would be mounted in a condenser similar to that shown in Fig. 1 and having coils subjected to the cooling effect of a current of air from the passing slipstream; and this condenser 213 would deliver in a tangential direction into a centrifugal separator 214 similar to the separator 67.

The gas filter 212 may have the usual construction of any type of effective gas filter. In the present instance in Fig. 3 I have illustrated it as comprising an inner compartment 215 into which the gas is admitted and this compartment has a wall 216 of fine screen material. This central compartment 215 is completely surrounded above and on the sides by a filter space containing activated carbon 217 which is retained in an outer container 218 having a wall of screen material. This arrangement enables the gas to pass through in all directions into an outside envelope or container 219 the outlet of which connects to the condenser 213.

As illustrated in Fig. 2, the water passing down from the separator 214 may be passed, if desired, through a filter 220, although under ordinary conditions this filter could be dispensed with.

In Fig. 4 I illustrate a chart showing a plotted curve 221 which indicates the condensation rate in pounds per hour (ordinates) plotted against flying altitudes measured in a horizontal direction. This chart also shows a curve 222 that indicates the temperature of the exit gases plotted against altitudes.

Figure 12:
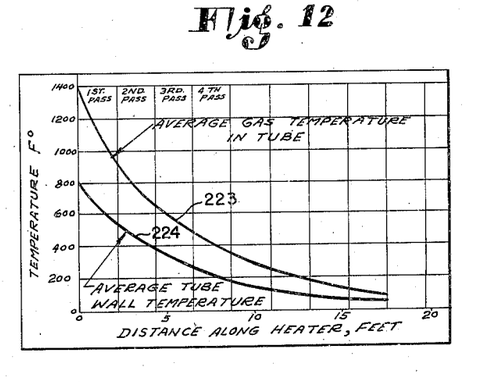
Fig. 12 is a view showing curves: indicating the average gas temperature after going through the successive passes that guide the gas through the condenser, and another curve showing the average tube wall temperature in the different passes. The abscissas indicate distance along the heater tubes in feet and the vertical ordinates indicate temperatures in Fahrenheit degrees.

In Fig. 12 I illustrate another chart with plotted curves 223 and 224 respectively indicating the average gas temperature in the cooling tubes of the condenser, and the average cooling tube wall temperature. This chart indicates these temperatures plotted against abscissas ranging from five feet of length of cooling tubes, to twenty feet. These two curves of course have very similar characteristics and while the temperature of the tube wall is approximately 800° at the point where the gases are admitted, the gas temperature will be approximately 1400°. These curves of course approach each other so that when the gas passes out of the condenser the adjacent tube wall has approximately its same temperature.

The filter bed referred to above, and which I maintain for removing the toxic and acid ingredients from the gases or from the condensate water, must have a physical structure such that its granules will present a maximum superficial area, and this material should have a fineness enabling it to pass through a No. 20 mesh screen and be retained by a No. 48 mesh screen. A satisfactory carbon for this purpose is an activated carbon made from nut shells, such as the shells of cocoanuts. An activated carbon that is satisfactory for this purpose and which is found to fulfill these requirements is obtainable on the market and is known commercially as "Columbia" brand, grade F. It is manufactured by the Carbide and Carbon Chemical Company of New York City.

In this connection it should be stated that I have found that the water condensate in practicing this method has a pH of approximately 3.5, and in order to render this water potable and useful for all purposes on board a transport aircraft it is necessary to reduce this to approximately a neutral condition, that is to say approximately pH 7.

In the following table I indicate the characteristics of the water after filtering with this activated carbon as compared with the characteristics of the water condensate before filtration:

|  | Water of Combustion Before Passing over Activated Carbon | After Passing Through Carbon Bed |
|---|---|---|
| Odor | sharp aromatic | faint aromatic. |
| Color | dirty green | 0 (color removed). |
| Taste | bitter almonds | none. |
| Turbidity | fine carbon suspensions | 1.5. |
| pH | 3.4 | 6.95. |
| NO |  |  |
| NO$_2$ | 1 P. P. M. | none. |
| NH$_3$ | 333 P. P. M. | 18.8 P. P. M. |
| Organic Nitrogen | 1.2 P. P. M. | .36 P. P. M. |
| Lead | 20 P. P. M. | Less than 1 part in 40,000,000. |
| Phenol | 28.2 P. P. M. | Less than 1 part in 50,000. |
| Cyanide | Negative | Negative. |

P. P. M.=Parts per 1,000,000.

The above table gives an average of three samples of water, and in conducting the test two gallons of water condensate were passed through approximately 25 grams of activated carbon in a column of one half inch in diameter and sixteen inches long. The water was floated up through the activated carbon.

Figure 6:
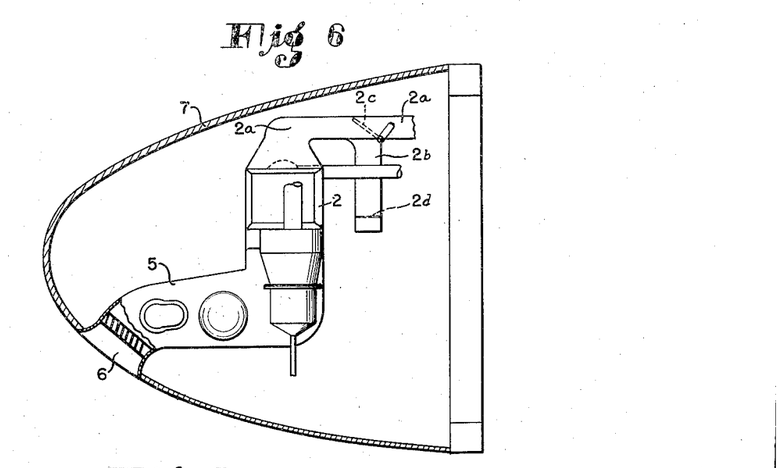
Fig. 6 is a vertical section taken in a front and rear plane illustrating how the apparatus shown in Fig. 5 can be applied, if desired, within the leading edge of a wing to facilitate taking air from the slipstream.

My apparatus and method described above can be used to furnish a heating medium to the de-icing apparatus of the aircraft. Means for accomplishing this is indicated in Fig. 6 in which 2a indicates the outlet of air that has passed through the condenser 2. This outlet 2a is illustrated as provided with a branch 2b, and at the junction point of this branch with the outlet 2a a spreader valve 2c of vane type may be employed. In Fig. 6 this spreader valve is indicated in dotted lines and in the position indicated it will deflect all of the hot air passing through the outlet 2a down into the branch 2b, which would have an extension 2d leading off to the de-icing apparatus.

With this apparatus described, and practicing my method, sufficient water for all purposes on an aircraft can be recovered from the exhaust gases from the engine or engines, at the same time accomplishing a very substantial saving in the weight of water that an aircraft would be obliged to carry to afford a water supply equivalent to that possible by practicing my invention. For example, it would require considerably over 300 pounds of water on a certain air conditioned cabin airplane now in construction for crossing the Atlantic, not including the weight of water that this plane would have to carry for other purposes. My apparatus if installed on such a plane would hardly increase the weight of the plane by more than seventy-five pounds and this would afford a water supply of approximately fifty pounds per hour.

Figure 13:
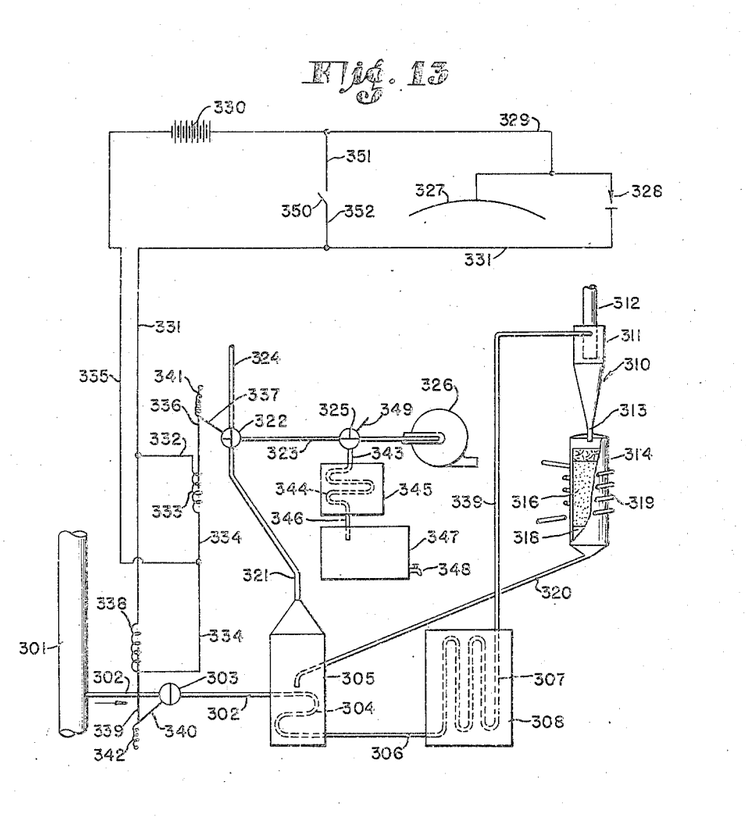
Fig. 13 is a diagrammatic representation of an illustrative embodiment of my invention as it may be applied to an aircraft including means for distilling the recovered water, and illustrating its utilization for humidifying the air therein, as well as for obtaining a supply of water for other purposes.

If desired accessory apparatus for distilling the drinking water may be provided. Such an apparatus will now be described and is illustrated in Fig. 13 in which 301 indicates the exhaust pipe of an internal combustion engine which may be the engine of an airplane. A pipe or conduit 302 leading from the exhaust pipe, and provided with a valve 303, serves to conduct exhaust gases to the heating coil 304 of a water evaporator or still 305, which is provided for a purpose to be more fully explained hereinafter. From the evaporator coil 304 the exhaust gases are conducted through a pipe 306 to the coils 307 of an air cooled condenser 308 which may be located at some convenient point outside the fuselage of the plane, for example, in the forward edge of one of the wings.

As the exhaust gases pass through the condenser coils 307 the moisture content of the gases is condensed therefrom to form water, and the condensed water, together with uncondensed gases, is conducted through the pipe 309 to a separator 310, in which the water is separated from the uncondensed gases entrained therewith. The separator 310 may be of the conventional centrifugal type embodying a cylindrical casing 311 into which the pipe 309 discharges tangentially so that the liquid is caused to whirl around the inner surface of the casing thereby liberating any entrained gases, the liquid gravitating to the funnel shaped bottom of the separator, and the liberated gases escaping up through the open lower end of a centrally arranged pipe 312 which may discharge into the atmosphere exteriorly of the fuselage of the plane.

The gas-free water passes from the separator 310 through a pipe 313 and into a filter 314 containing a removable cartridge 315 filled with the filtering material, the principal part of which is a bed 316 of activated carbon of the type having high absorption qualities for hydrocarbons.

Preferably a layer of asbestos fibres 317 is provided on top of the bed of activated carbon for the purpose of removing oily ingredients and entrained solids from the water before it passes through the carbon, thereby prolonging the life of the carbon before replacement becomes necessary.

As already stated, I have found that, by passing the water through the bed of filtering material above described the solids are effectively removed by the asbestos fibres, and the hydrocarbons by the absorbent action of the activated carbon. However, if desired, a layer of silica gel may be placed beneath the bed of activated carbon, as indicated at 318, for further removing any impurities from the water which the asbestos fibres and activated carbon have failed to take up.

It has also been found that the capacity of the activated carbon to absorb and thus remove hydrocarbons from the water passed through it, is increased if it is kept warm during the filtering operation. I, therefore, may provide for heating the filter 314 by means of a heating coil 319 surrounding the filter casing, and to which heat may be supplied in any suitable manner, as for example by passing a part of the engine exhaust gases through it. An electric heating coil could be used in place of the coil shown, if preferred.

After passing through the filtering materials in the filter 314, the water passes through a pipe 320 into the evaporator 305, where it is heated by the exhaust gases passing through the coil 304. The water is thus vaporized, and freed from any solids which may have escaped removal in the filter 314.

It should be understood that the evaporator need not be arranged in association with the pipe 302, but can, if desired, be placed wherever desirable to receive sufficient heat from the engine, as for example in association with the exhaust pipe 301. The arrangement illustrated has the advantage, however, of assisting the condenser 308 in the cooling of the exhaust gases.

The water vapor generated in the evaporator 305 is conducted by a pipe 321 to a three-way valve 322 which may be adjusted to allow the vapor to pass through either of two pipes 323 or 324. The pipe 323 may lead through a three-way valve 325 to the inlet side of the supercharging blower or pump 326 utilized for maintaining an elevated air pressure within the cabin of the plane, whereby the moisture is disseminated into the atmosphere interiorly of the plane, thereby humidifying it, and also heating it to some extent, thus assisting the regular heating system of the plane. When the vapor generated in the evaporator 305 is not to be used, the valve 322 can be adjusted so as to permit it to pass to the atmosphere exteriorly of the plane through the pipe 324.

For automatic regulation of the humidity, a humidostat 327 may be disposed within the cabin of the plane, such humidostat being arranged to actuate a switch 328 connected at one side to a wire 329 leading from a battery 330. The other side of the switch 328 may be connected by means of wires 331 and 332 to a solenoid winding 333, which is also connected to the battery by means of wires 334 and 335. The plunger 336 of the solenoid 333 may be connected to the arm 337 of the valve 322 whereby upon energization of the solenoid, the valve is turned to connect the pipes 321 and 323. A second solenoid winding 338 is connected to wires 331 and 334, and the plunger 339 of the solenoid 338 is connected to the operating arm 340 of the valve 303, the arrangement being such that when the solenoid 338 is energized, the valve 303 is opened. Springs 341 and 342 are respectively associated with the valve arms 337 and 340 to normally maintain the valves in the positions shown, when the solenoids are inactive.

In the operation of the apparatus, so long as the humidity within the plane is at or above the desired degree, the switch 28 will remain open; the valve 303 will be in its normally closed position as illustrated; the valve 322 will be in position to conduct the vapor from the pipe 321 to the pipe 324 so that it discharges into the atmosphere exteriorly of the plane through the pipe 324; and the valve 325 will be in the position shown.

When the humidity within the cabin drops below the desired point, the humidostat 327 automatically closes the switch 328, thereby energizing the solenoids 333 and 338 so as to open the valve 303 and turn the valve 322 to closeoff the pipe 324 and direct the vapor from the evaporator 305 into the pipe 323.

Combustion gases from the exhaust pipe 301 will now pass through the pipe 302, evaporator coils 304, and into the condenser coils 308 where the moisture in the gases is condensed. The condensate, together with uncondensed gases, passes on into the separator 311 where the uncondensed gases entrained with the condensate are liberated and discharged to the atmosphere through the pipe 312, and the gas free water gravitates into the filter 314. After passing through the filtering materials in the filter 314, the filtrate is thence directed into the evaporator 305 where it is vaporized, and the vapor passes through the pipes 321 and 323 into the inlet side of the pump 326 which disseminates it into the air within the cabin of the plane.

As soon as the humidity within the plane has risen to the desired extent, the humidostat 327 will automatically operate to open the switch 328, thereby de-energizing the solenoids 333 and 338 so that the valve 303 closes and the valve 322 is returned to the position illustrated in Fig. 13. Upon closing the valve 303 the flow of exhaust gases through the system is cut off so that no more water will be generated. At the same time the vapor yet remaining in the evaporator 305, and whatever additional vapor may be generated from the water remaining in the system until it cools off, is directed to the outside atmosphere through the discharge pipe 324. The system is thus rendered inactive until such time as the humidity again falls sufficiently to cause the humidostat to close the switch 328, whereupon the cycle of operations is repeated.

When using the method and apparatus of my invention to generate a supply of water for sanitary, drinking, or such other purposes as may be desired (and to this end I have illustrated), a branch pipe 343 leads from the three way valve 325 to the coils 344 of a condenser 345 which may be of the air cooled type and preferably located outside the fuselage of the plane. The condenser coils 344 are connected to a drain pipe 346 which discharges into a tank or reservoir 347 from which the water may be drawn off as desired from a faucet 348.

Whenever it is desired to accumulate a supply of water in the tank 347, the arm 349 of the valve 325 is manually actuated to turn the valve into position to close off that portion of the pipe 323 to the right of the valve and put the other section of the pipe into communication with the pipe 343. If the humidity in the plane is such that the humidostat switch 328 is open, the system may be set in operation by closing the manually operated switch 350, connected to wires 329 and 331 by wires 351 and 352, whereupon the solenoids 333 and 338 will be actuated to adjust the valves 303 and 322 as before described. The water vapor passing through the pipe 323 will now be diverted, however, by the valve 325 into the pipe 343 leading to the condenser 345 wherein the vapors are condensed, and the water drains into the tank 347. When the desired quantity of water has been accumulated in the tank 347, the switch 350 may be opened and the valve 325 turned back to its original position, whereupon the system will cease operation and control of it is returned to the humidostat 327.

Figure 14:
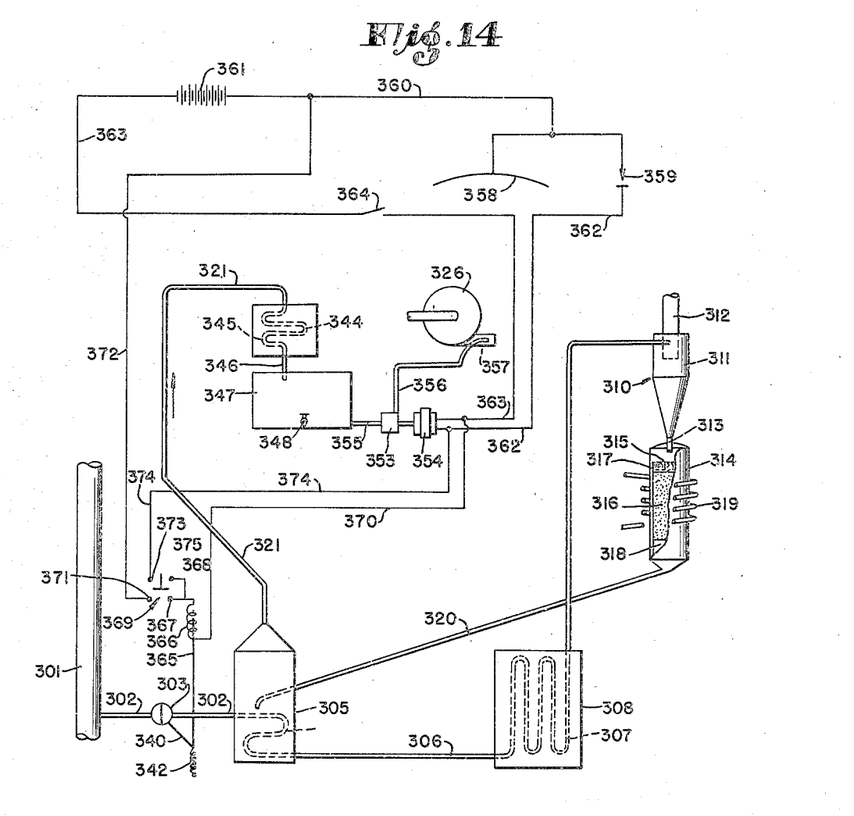
Fig. 14 illustrates a partial modification of the arrangement shown in Fig. 13.

Fig. 14 of the drawings illustrates a modification of the arrangement shown in Fig. 13 whereby the vapors generated in the evaporator 305 are condensed, and the humidification accomplished by spraying or atomizing the condensate into the air to be humidified. By this arrangement the humidification may be accomplished without adding any heat to the humidified air, as where the vapor itself is introduced into it, and the water supply may also be generated without interrupting the operation of the automatic humidity control.

It will be noted that the arrangement and mode of operation of the evaporator 305, condenser 308, separator 310 and filter 314 are the same in Fig. 14 as in Fig. 13. In Fig. 14, however, the vapor pipe 321 leading from the evaporator 305, connects only with the condenser 345 so that all the vapor is condensed, and drains into the tank 347. A small pump 353, driven by verting a regulated portion of the hot gases of combustion to said last means operating to maintain a sufficiently high temperature at the condenser to prevent freezing of the condenser means and the condensate water; separator means for separating the water condensate from the hot gases received from the condenser; and means, including a thermostat, for controlling the effective area of exhaust for the waste gases from the separator.

4. In a passenger aircraft having internal combustion propelling means, the combination of: condenser means exposed to the atmospheric slip-stream passing the aircraft, for condensing condensible constituents of exhaust gases from the engine, including water; means for diverting a regulated portion of the hot gases of combustion to said last means; separator means for separating the water condensate from the hot gases received from the condenser; means, including a thermostat, for controlling the effective area of exhaust for the waste gases from the separator; and means for removing impurities from the water.

5. A passenger aircraft according to claim 3, including means for regulating the amount of hot exhaust gases diverted to the said condenser means controlled by the air pressure developed in flight, within the air inlet to the condenser.

6. In apparatus for recovering water from waste gases from an internal combustion engine on an aircraft, the combination of: means for cooling the gases of combustion of said engine and for collecting condensate water; a filter bed of activated carbon of a type capable of substantially eliminating the acidity and the toxic properties of the water condensate; and means for conducting the condensate water to the filter bed.

7. In apparatus for recovering water from exhaust gases from internal combustion propelling means for an aircraft, the combination of: condenser means having a duct for conducting the gases of combustion through the condenser means and having a duct for conducting air from the atmospheric slip-stream through the condenser means, said condenser means including a series of passes having walls for guiding the gases of combustion through the condenser means through which the gases pass in succession; a thermostatic device disposed so as to receive heat from the gases of combustion leaving the condenser means; and means controlled through the agency of said thermostatic device for regulating the quantity of gases of combustion which pass through the condenser means.

8. A method of obtaining purified water from the combustion products of an internal combustion engine on an aircraft, which consists in condensing gases of combustion from the engine through the agency of the atmospheric slip-stream passing the aircraft, and collecting the condensate; employing a regulated portion of the gases of combustion from the engine to prevent freezing of the water condensate; and thereafter removing the toxic ingredients from the condensate.

9. A method of obtaining purified synthetic water vapor suitable for human needs from hot gaseous combustion products of hydrocarbon fuels comprising the steps of: condensing moisture from such products; filtering the condensate through a sorption medium; subjecting the filtrate to heat to vaporize it; and segregating the purified vapor in concentrated form.

10. A method of obtaining purified synthetic water vapor suitable for human needs from hot gaseous combustion products of hydrocarbon fuels comprising the steps of: condensing moisture from such products; passing the condensate through a filtering material highly sorptive to hydrocarbon impurities but permitting free passage of water residue and obtaining the water filtrate thereof; subjecting the filtrate to heat to vaporize it; and segregating the purified vapor in concentrated form.

11. A method of obtaining purified synthetic water vapor suitable for human needs from hot gaseous combustion products of hydrocarbon fuels comprising the steps of: cooling said combustion products to condense moisture therefrom; separating entrained gases from the condensate; passing the condensate through a bed of filtering material to remove hydrocarbon and other impurities and obtaining the water filtrate of said condensate; subjecting said filtrate to heat to vaporize it; and segregating the purified water vapor in concentrated form.

12. A method of obtaining purified synthetic water suitable for human needs from hot gaseous combustion products of hydrocarbon fuels comprising the steps of: condensing moisture from such products; passing the condensate through a sorptive filtering medium and obtaining the purified water filtrate thereof; and distilling the filtrate.

13. A method of obtaining purified synthetic water vapor suitable for human needs from the hot exhaust gases of an internal combustion engine utilizing hydrocarbon fuel comprising the steps of: cooling said exhaust gases to condense moisture therefrom; filtering the condensate with a sorptive substance; subjecting the filtrate to the heat of exhaust gases from which moisture is to be subsequently condensed, to vaporize the filtrate and assist in cooling said exhaust gases; and segregating the purified water vapor of said vaporized filtrate in concentrated form.

14. In an apparatus for producing purified synthetic water vapor suitable for human needs from hot gaseous combustion products of hydrocarbon fuels, the combination comprising: a condenser for receiving said combustion products and condensing moisture therefrom; a filter for removing hydrocarbon and other impurities from said condensate; means for conducting condensate from said condenser to said filter; an evaporator for vaporizing the filtered condensate and removing further impurities from said filtered condensate; means for conducting filtered condensate from said filter to said evaporator; means for supplying heat to said evaporator to vaporize the filtered condensate introduced therein; and means for segregating the purified filtered condensate in concentrated form.

15. In an apparatus for producing purified synthetic water vapor suitable for human needs from hot gaseous combustion products of hydrocarbon fuels, the combination comprising: a conduit for said hot combustion products; a condenser connected with said conduit for receiving combustion products therefrom and condensing moisture from said products; a filter for removing hydrocarbon and other impurities from said condensate; means for conducting condensate from said condenser to said filter; an evaporator for vaporizing said filtered condensate, to further purify the same, associated with said conduit to receive heat therefrom; means for conducting filtered condensate from said filter to said evaporator;

an electric motor 354 is provided to withdraw water from the tank 347 through a pipe 355 and deliver it under pressure through a pipe 356 to a nozzle 357 which sprays or atomizes it into the air discharged from the blower 326.

The operation of the pump 353 may be automatically controlled by the humidostat 358 located within the cabin of the plane and arranged to actuate an electric switch 359. The switch 359 may be connected at one side by a wire 360 to a battery 361, and the other side of the switch 359 is connected by a wire 362 to one terminal of the motor 354. The circuit is completed by a wire 363 leading from the other terminal of the motor through a manually operated master switch 364 to the battery 361. By this arrangement, assuming the master switch 364 to be closed, whenever the humidity within the plane falls sufficiently to cause the humidostat to actuate switch 359, the motor 354 is energized to drive pump 353 so as to pump water from the tank 347 to the atomizer nozzle 357 from which it is ejected into the air. When the humidity rises to the selected point the humidostat opens the switch 359 whereby the motor 354 is de-energized and the spray stops.

The valve 303 is automatically operable by a solenoid plunger 365 connected to the valve arm 340, the valve being normally urged into closed position as shown, by the spring 342. The solenoid winding 366 is connected at one side to the poles 367 and 368 of a four pole double throw switch 369 and at its other side by a wire 370 to the wire 363. The pole 371 of the switch is connected by a wire 372, to the wire 360, and the pole 373 is connected by a wire 374 to the wire 362.

In the operation of the modification shown in Fig. 14 the entire system is inoperative so long as the master switch 364 is in open position as illustrated, since neither the motor 354 nor the solenoid winding 366 are energized, and the valve 303 will remain closed due to the action of the spring 342. To put the automatic humidity control into operation, the master switch 364 is closed, and the switch arm 375 is elevated to interconnect the switch poles 368 and 373. Thereupon whenever the humidity falls sufficiently to cause the humidostat to actuate the switch 359, the solenoid 366 will be energized to open the valve 303 and permit exhaust gases to flow from the exhaust pipe 301 through the pipe 302. These gases are cooled in the condenser 308 to condense the moisture therefrom, and the condensate is freed of entrained gases in the separator 310, filtered by the filter 314, vaporized in the evaporator 305, condensed by the condenser 345, and the purified water collected in the tank 347, all in the same manner hereinabove described in connection with the operative description of Fig. 13.

It will be noted that closing of the humidostat switch 358 also energizes the motor 354 to drive the pump 353 whereby water is pumped from the tank 347 to the nozzle 357 where it is atomized into the air discharged from the blower 326. When the humidity reaches the point where the humidostat opens the switch 359, the motor 354 will thereupon stop and the valve 303 will close, thus stopping the operation of the entire system until the humidostat again closes the switch 359.

If it is desired to accumulate a greater quantity of water in the tank 347 than would be generated in the operating periods established by the operation of the humidostat, the generating system can be kept in operation during such periods as described, irrespective of the operation of the thermostat, merely by depressing the switch arm 375 to connect the switch poles 367 and 371 and disconnect the poles 368 and 373. With the switch in this position it will be apparent that the solenoid 366 will be energized to keep the valve 303 open regardless of whether the humidostat switch is open or closed. The motor 354 will only be energized, however, when the humidostat closes the switch 359 as before. Thus the system can be operated to generate water continuously, but to disseminate moisture into the air only during the periods established by the humidostat.

It will be understood that although I have described my invention as it may be applied to an airplane, its utility is not confined thereto, but extends to any engine or turbine driven conveyance wherein it is desired to generate purified synthetic water or water vapor from the exhaust gases of the engine or turbine. In fact the invention may also be used in connection with stationary engines and turbines wherever the occasion seems desirable.

It may also be mentioned that in addition to being useful for the purposes hereinabove referred to, my invention may be used to generate water or water vapor for other purposes as well. For example, by substituting a thermostat for the humidostat in the modification shown in Fig. 14 of the drawings, the system would be well adapted for cooling the air in automobiles, military tanks and other conveyances operated in hot climates.

Many other embodiments of the invention may be employed without departing from the spirit of the invention.

I claim as my invention:

1. In a passenger aircraft having an aircraft body with an air conditioned cabin, and internal combustion propelling means carried by said body, the combination of: condenser means exposed to the atmospheric slip-stream passing the aircraft, for condensing condensible constituents of exhaust gases produced on the aircraft, including water; a conduit for conducting said exhaust gases to said condenser means; and means responsive to the temperature of exhaust gases which have passed through said condenser means for varying the flow of said exhaust gases through said condenser means.

2. In a passenger aircraft having an aircraft body with an air conditioned cabin, and internal combustion propelling means carried by said body, the combination of: condenser means exposed to the atmospheric slip-stream passing the aircraft, for condensing condensible constituents of a portion of the exhaust gases from the internal combustion propelling means, including water; a conduit for conducting said exhaust gases to said condenser means; means associated with said second named means for maintaining the temperature of the condenser means and the condensate above the freezing point; and means responsive to the temperature of exhaust gases which have passed through said condenser means for varying the flow of said exhaust gases through said condenser means.

3. In a passenger aircraft having internal combustion propelling means, the combination of: condenser means exposed to the atmospheric slip-stream passing the aircraft, for condensing the condensible constituents of the exhaust gases from the engine, including water; means for diand means for segregating the purified vaporized filtered condensate in concentrated form.

16. In an apparatus for producing purified synthetic water vapor suitable for human needs from the hot exhaust gases of an internal combustion engine utilizing hydrocarbon fuel, the combination comprising: a condenser for receiving said combustion products and condensing moisture therefrom; a separator for separating entrained gases from the liquid condensate; means for conducting condensate from said condenser to said separator; a filter for removing hydrocarbon and other impurities from said liquid condensate; means for conducting liquid condensate from the separator to the filter; an evaporator to further purify the filtrate; means for conducting the filtrate to said evaporator; means for supplying heat from said engine to said evaporator to vaporize the filtrate introduced therein; and means for segregating the purified vaporized filtrate in concentrated form.

17. A method of obtaining purified synthetic water from the hot exhaust gases of an internal combustion engine utilizing hydrocarbon fuel, comprising the steps of: cooling exhaust gases of said engine to condense moisture therefrom; filtering the condensate; subjecting the filtrate to the heat of exhaust gases from said engine to vaporize the filtrate and assist in cooling such exhaust gases; and condensing said vapor.

18. An apparatus for obtaining purified synthetic water for drinking purposes from the hot exhaust gases of an internal combustion engine utilizing hydrocarbon fuel, comprising: a condenser for receiving said gases and condensing moisture therefrom; a filter chamber containing a bed of activated carbon for removing hydrocarbon and other impurities from said condensate; means for conducting condensate from said condenser to said filter; an evaporator for vaporizing the filtered condensate to remove further impurities therefrom; means for conducting filtered condensate from said filter to said evaporator; means for supplying hot exhaust gases from the engine to said evaporator in heat interchange relationship with the filtered condensate to furnish heat for vaporizing the filtered condensate; means for condensing the vaporized filtrate; and means for conducting the vaporized filtrate from the evaporator to said condensing means.

19. In a passenger aircraft having internal combustion propelling means, the combination of: condenser means exposed to the atmospheric slip-stream passing the aircraft, for condensing the condensible constituents of the exhaust gases from the engine, including water; means for diverting a portion of the hot gases of combustion to said condenser means; separator means for separating the water condensate from the hot gases received from the condenser; a valve for varying the flow of said hot gases of combustion through said condenser means; and means responsive to changes in the flow of slip-stream air through said condenser means to impart opening and closing movement to said valve as the flow of slip stream air through said condenser means rises and falls.

20. A method of obtaining water, safe to be taken into the human system, from the combustion products of hydrocarbon fuel combustion propelling means on an aircraft, which consists of diverting a portion of the combustion products coming from the propelling means and having water therein; cooling said diverted portion in a condenser to condense the water therein by means of the aircraft slip-stream air; regulating the quantity of said diverted combustion products proportionately to the flow of said slip stream air passing through said condenser; removing the toxic ingredients from the water at a time subsequent to diverting said portion of said combustion products coming from the propelling means; and segregating the purified water in liquid state.

21. A method of obtaining water, safe to be taken into the human system, from the combustion products of hydrocarbon fuel combustion propelling means on an aircraft, which consists of diverting a portion of the combustion products coming from the propelling means and having water therein; cooling said diverted portion in a condenser to condense the water therein by means of the aircraft slip-stream air; regulating the quantity of said diverted combustion products proportionately to the flow of said slip stream air passing through said condenser; removing the toxic ingredients from the water at a time subsequent to diverting said portion of said combustion products coming from the propelling means; segregating the purified water in liquid state; and regulating the quantity of said diverted combustion products with reference to the temperature of said combustion products leaving said condenser.

22. A method of obtaining water, safe to be taken into the human system, from the combustion products of hydrocarbon fuel combustion propelling means of an aircraft which consists of diverting a portion of the combustion products coming from the propelling means and having water therein; cooling said diverted portion in a condenser to condense the water therein by means of the aircraft slip-stream air; removing the toxic ingredients from the water at a time subsequent to diverting said portion of said combustion products coming from the propelling means; segregating the purified water in liquid state; and regulating the quantity of said diverted combustion products with reference to the temperature of said combustion products leaving said condenser.

23. A method of obtaining water from the combustion products of hydrocarbon fuel combustion propelling means of an aircraft which consists of diverting a portion of the combustion products coming from the propelling means and having water therein; cooling said diverted portion in a condenser to condense the water therein by means of the aircraft slip-stream air; regulating the quantity of said diverted combustion products proportionately to the flow of said slip stream air passing through said condenser; segregating the water in liquid state; and regulating the quantity of said diverted combustion products with reference to the temperature of said combustion products leaving said condenser.

24. A method of obtaining water from the combustion products of hydrocarbon fuel combustion propelling means of an aircraft which consists of diverting a portion of the combustion products coming from the propelling means and having water therein; cooling said diverted portion in a condenser to condense the water therein by means of the aircraft slip-stream air; regulating the quantity of said diverted combustion products proportionately to the flow of said slip stream air passing through said condenser; segregating the water in liquid state; and regulating the quantity of said diverted combustion products with reference to the temperature of said combustion products leaving said condenser.

25. A method of obtaining water from the combustion products of hydrocarbon fuel combustion propelling means of an aircraft which consists of diverting a portion of the combustion products coming from the propelling means and having water therein; cooling said diverted portion in a condenser to condense the water therein by means of the aircraft slip-stream air; segregating the water in liquid state; and regulating the quantity of said diverted combustion products with reference to the temperature of said combustion products leaving said condenser.

26. A method of obtaining water from the combustion products of hydrocarbon fuel combustion propelling means of an aircraft which consists of diverting a portion of the combustion products coming from the propelling means and having water therein; cooling said diverted portion in a condenser to condense the water therein by means of the aircraft slip-stream; regulating the quantity of said diverted combustion products proportionately to the flow of said slip-stream air passing through said condenser; and segregating the water in liquid state.

27. In a passenger aircraft having an air conditioned body and internal combustion operated means carried thereby, the combination of: a condenser exposed to the atmospheric slip-stream passing the aircraft, for condensing condensible constituents of exhaust gases produced by said internal combustion operated means including water; a conduit for conducting said exhaust gases to said condenser; and thermo-sensitive means responsive to the temperature of exhaust gases which have passed through said condenser for varying the flow of said exhaust gases through said condenser.

HARRY A. MULVANY.

REFERENCES CITED

The following references are of record in the file of this patent:

UNITED STATES PATENTS

| Number | Name | Date |
|---|---|---|
| 645,790 | Conover | Mar. 20, 1900 |
| 1,426,047 | Cooke | Aug. 15, 1922 |
| 1,716,479 | Bilsky | June 11, 1929 |
| 1,716,480 | Bilsky | June 11, 1929 |
| 1,870,809 | Handy | Aug. 9, 1932 |
| 1,939,418 | Silver | Dec. 12, 1933 |
| 1,987,604 | Corbett | Jan. 15, 1935 |
| 2,087,411 | Lundquist | July 20, 1937 |
| 2,150,678 | Fisher | Mar. 14, 1939 |
| 2,168,166 | Larrecg | Aug. 1, 1939 |
| 2,310,767 | Durr | Feb. 9, 1943 |

FOREIGN PATENTS

| Number | Country | Date |
|---|---|---|
| 603,414 | Germany | Sept. 28, 1934 |
| 636,563 | Germany | Oct. 14, 1936 |